United States Patent [19]

Hossack et al.

[11] Patent Number: 4,887,246
[45] Date of Patent: Dec. 12, 1989

[54] ULTRASONIC APPARATUS, SYSTEM AND METHOD

[75] Inventors: James M. Hossack, Seattle; Jeffry E. Powers, Bainbridge; John K. Billings, Snohomish, all of Wash.

[73] Assignee: Ultrasonic Arrays, Inc., Woodinville, Wash.

[21] Appl. No.: 532,576

[22] Filed: Sep. 15, 1983

[51] Int. Cl.[4] .............................................. H04R 23/00
[52] U.S. Cl. ..................................... 367/140; 367/105
[58] Field of Search ................ 367/103, 105, 140, 151

[56] References Cited

U.S. PATENT DOCUMENTS

| | | | |
|---|---|---|---|
| 3,086,195 | 4/1963 | Halliday | 367/103 |
| 3,325,779 | 6/1967 | Supernaw et al. | 367/151 |
| 3,389,372 | 6/1968 | Halliday et al. | 367/105 |
| 4,058,003 | 11/1977 | Macovski | 367/103 |
| 4,081,626 | 3/1978 | Muggli et al. | 367/140 |
| 4,104,610 | 8/1978 | Inoue et al. | 367/140 |
| 4,440,482 | 4/1984 | Shenk | 367/140 |

OTHER PUBLICATIONS

Electronic Product Design, vol. 2, pp. 33–35, Aug. 1981.
Kuhl et al, Acoustica, vol. 4, No. 5, 1954, pp. 519–532.

Primary Examiner—Thomas H. Tarcza
Assistant Examiner—Tod Swann
Attorney, Agent, or Firm—Flehr, Hohbach, Test, Albritton & Herbert

[57] ABSTRACT

Ultrasonic apparatus for use in detecting an object having a transducer. The transducer has an array of at least one element coupled directly into air. The apparatus also includes a transmitter which may be multi-channel, a receiver which may be multi-channel, a transmit receive switch, and a computer for causing operation of said transmit receive switch to cause sequential supplying of pulses of energy from the transmitter to the element or elements of the transducer and for receiving energy received by the transducer. The element or elements of the transducer are provided with a roughened surface to produce high frequency ultrasonic energy.

21 Claims, 9 Drawing Sheets

FIG. — 1

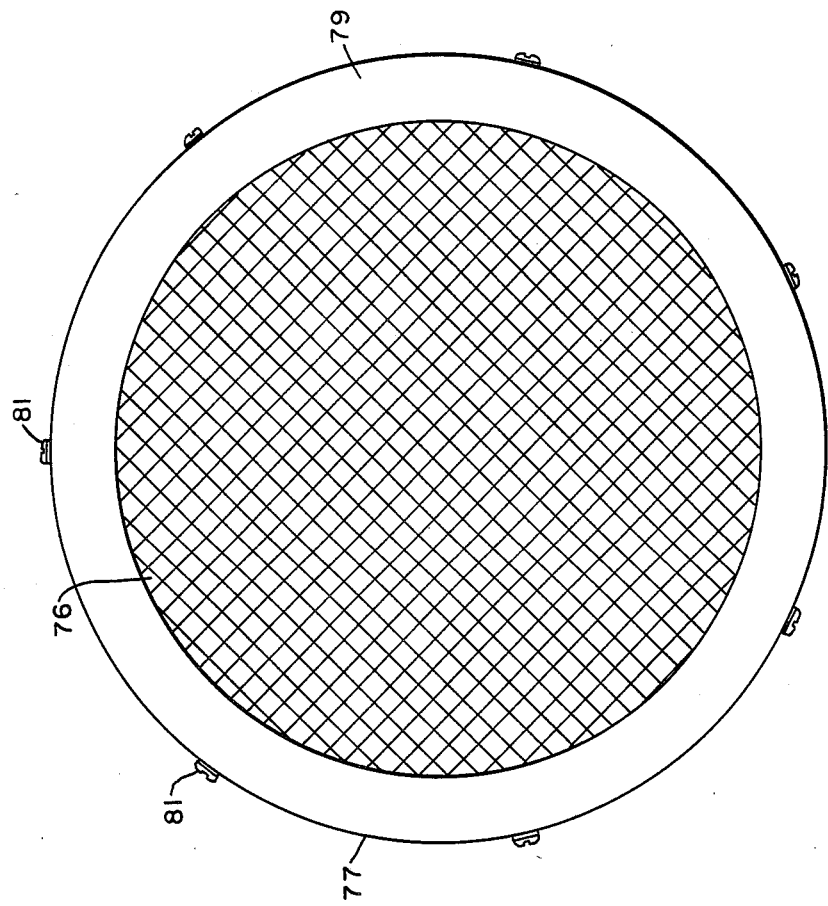
FIG.—4
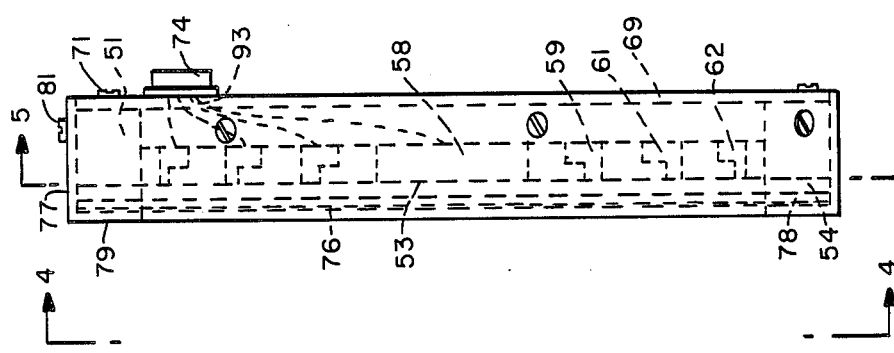
FIG.—3

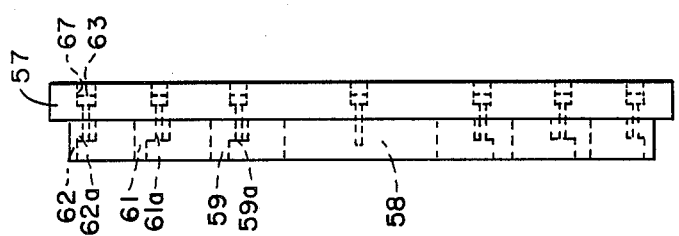
FIG.—6
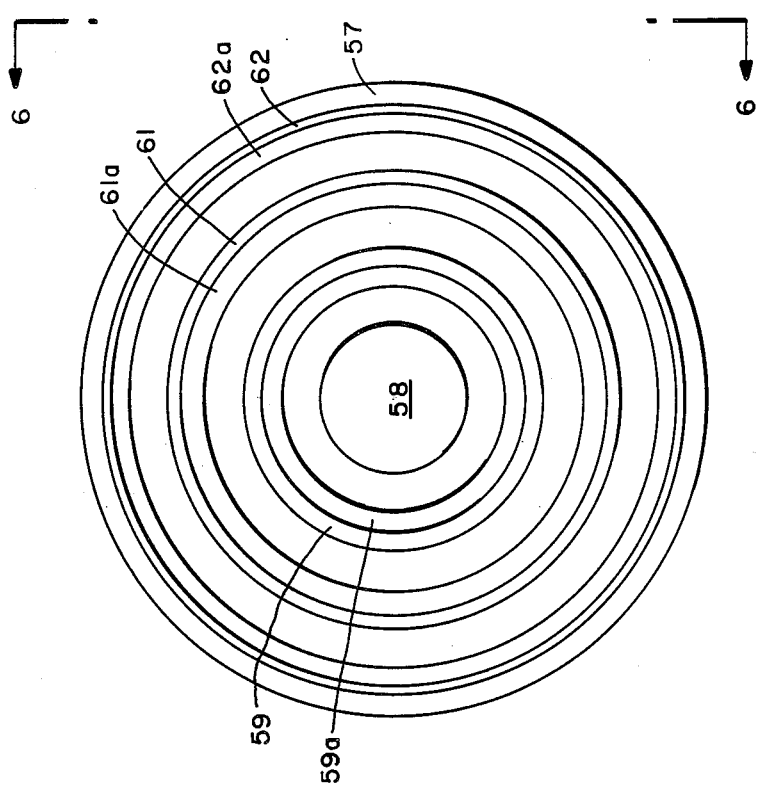
FIG.—5

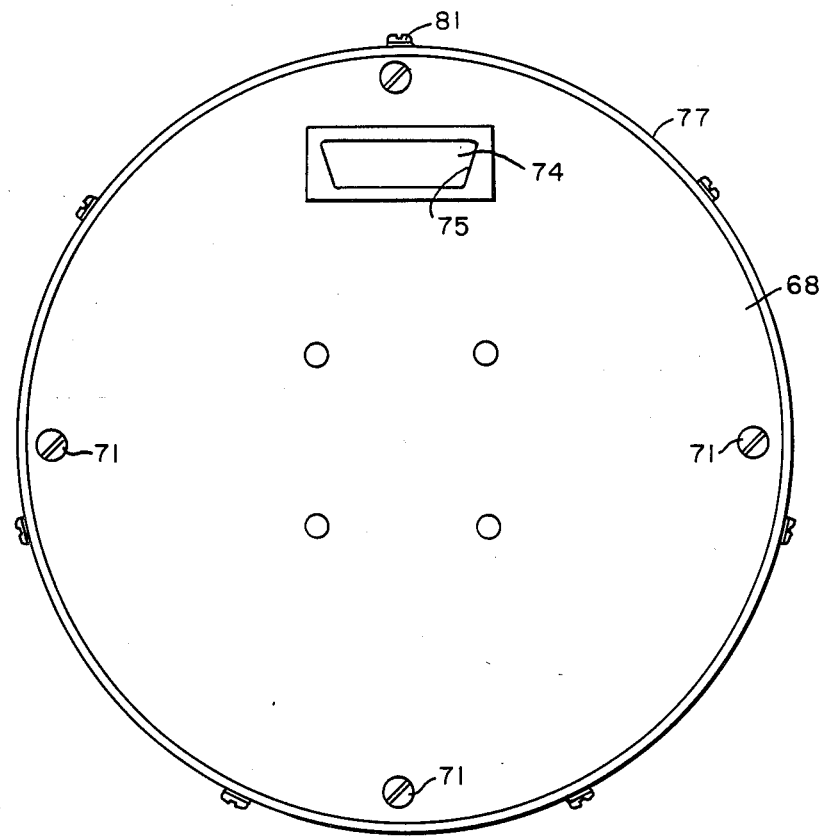
FIG.—7
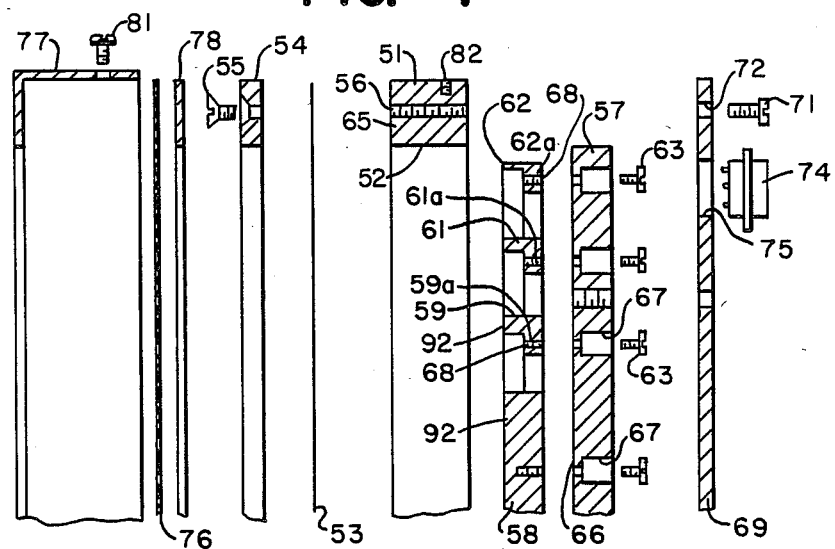
FIG.—8

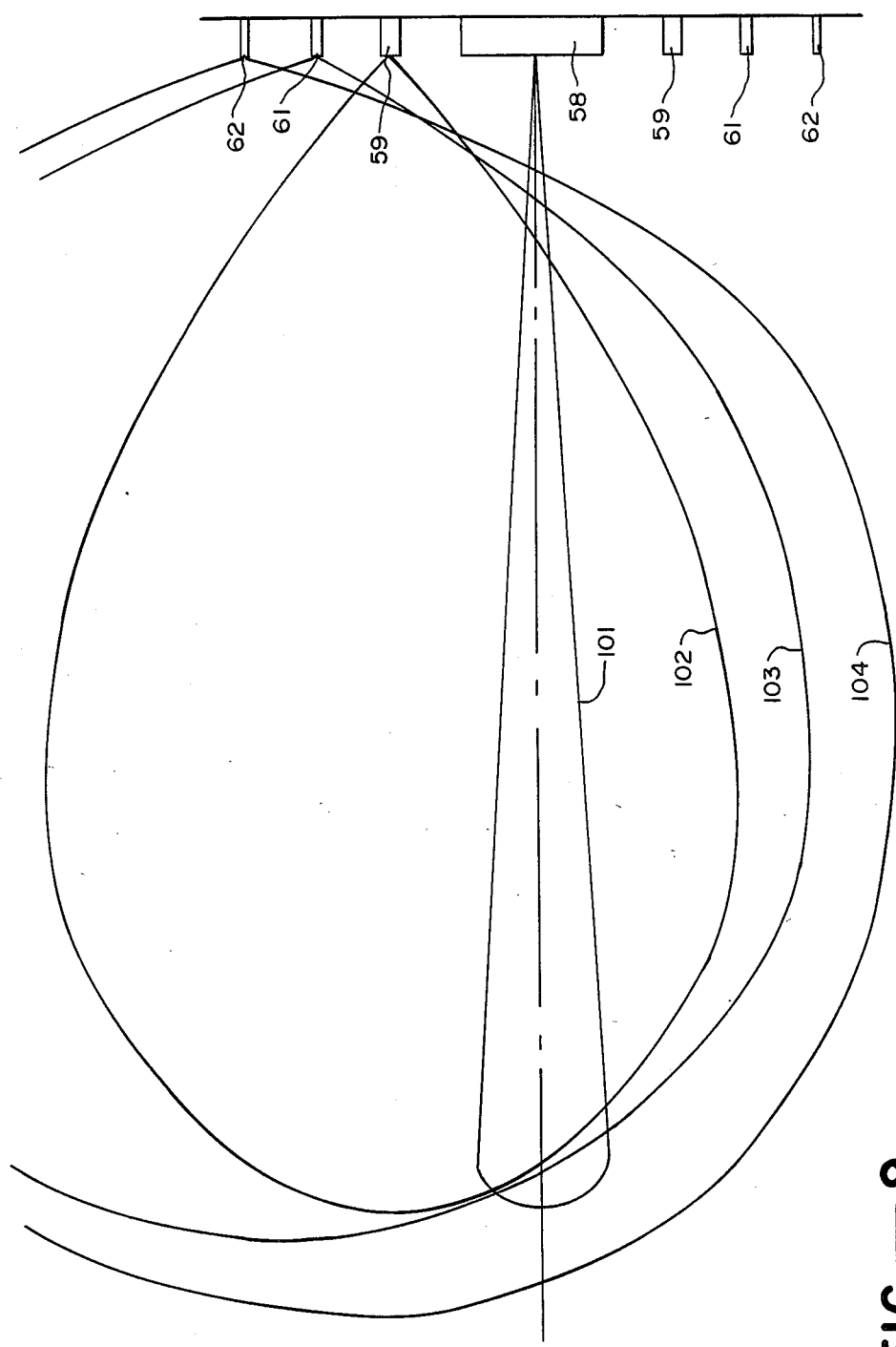
FIG.—9

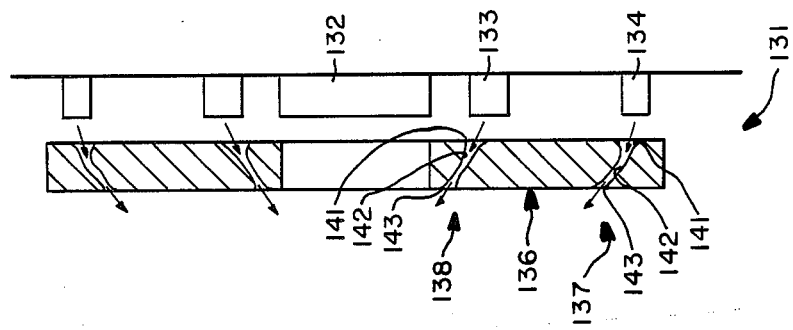
FIG.—15
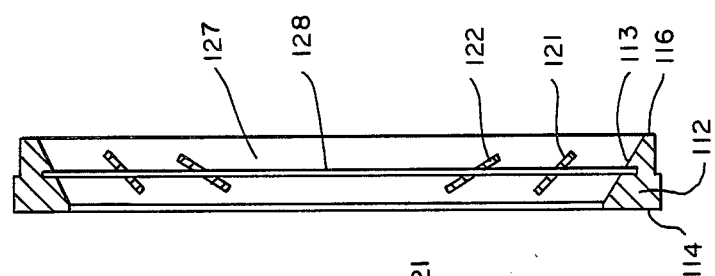
FIG.—14
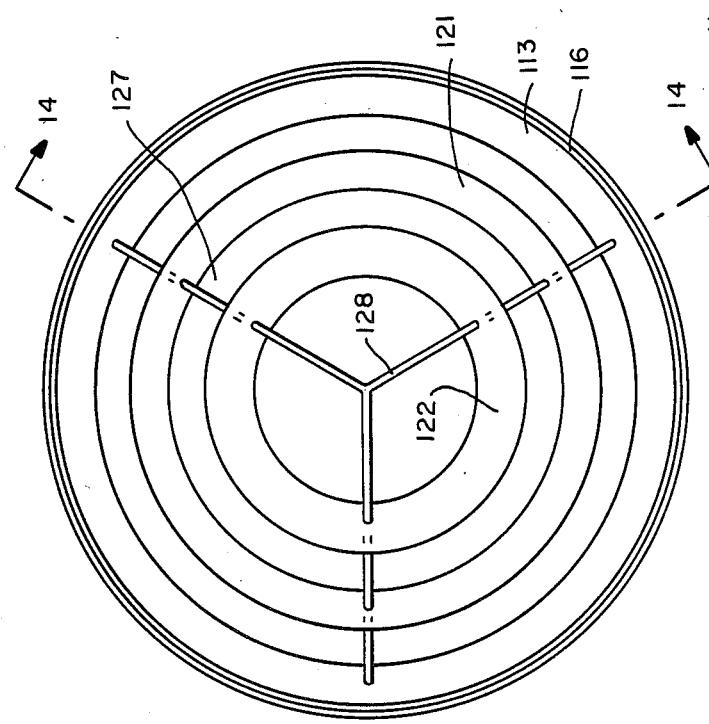
FIG.—13

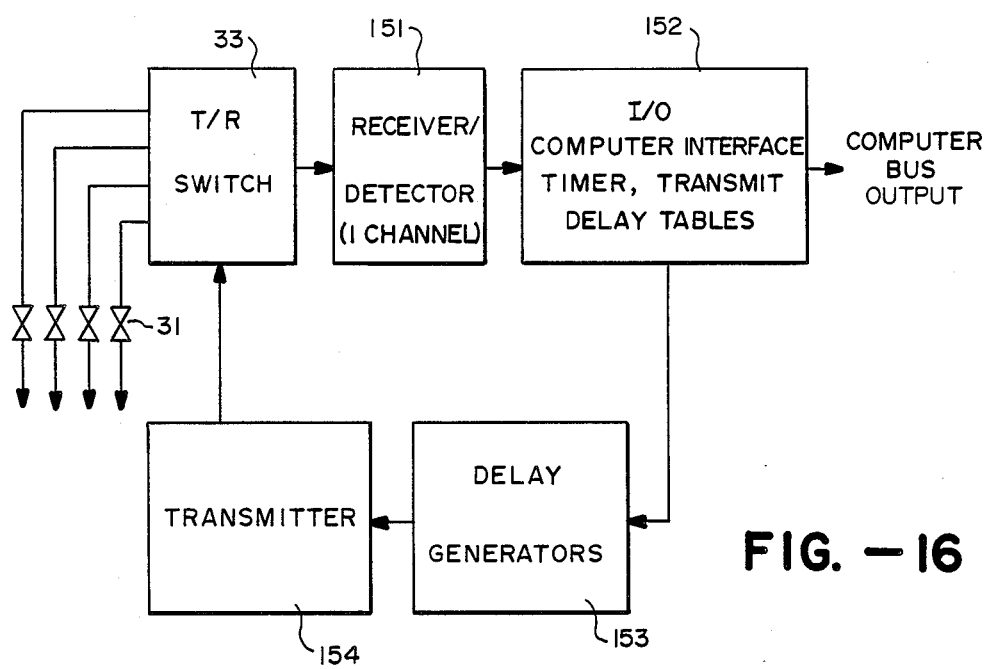
FIG. —16
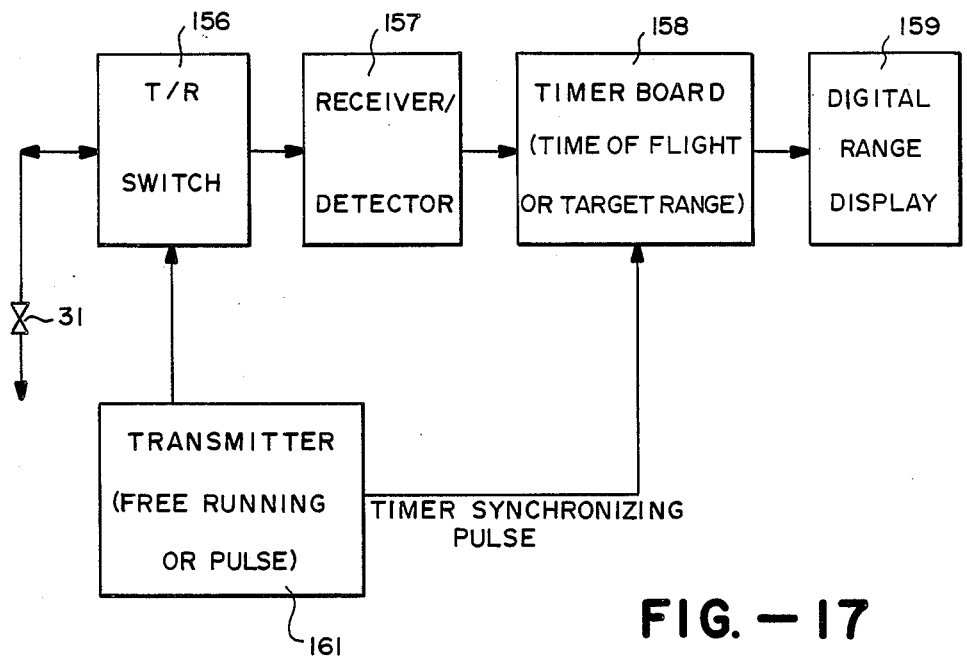
FIG. —17

ULTRASONIC APPARATUS, SYSTEM AND METHOD

This invention relates to an ultrasonic apparatus, system and method and more particularly to such an apparatus, system and method providing high range resolution.

Heretofore ultrasonic apparatus and systems and methods have been provided. However, in general such apparatus, systems and methods have been characterized in that they utilized low frequencies and did not provide a focused energy beam. It has been found that in many industrial processes there is a need for a ranging and non-contacting testing apparatus which utilizes a focused energy beam that can be utilized for detecting the edges of objects and ascertaining the size and shapes of objects. A narrow energy beam is desired to accurately describe the profile, topography, edge and other surface irregularities of an object. In order to obtain the great accuracy and detail of the target image it is desirable to have a beam of as small a diameter as possible.

In general, it is an object of the present invention to provide an ultrasonic apparatus, system and method which has a high range resolution.

Another object of the invention is to provide an apparatus, system and method of the above character which utilizes focused energy beams in air.

Another object of the invention is to provide an apparatus, system and method of the above character using relatively high frequency sound beams.

Another object of the invention is to provide an apparatus, system and method of the above character which is relatively inexpensive.

Another object of the invention is to provide an apparatus, system and method of the above character which is particularly applicable to robotics and industrial automation including handling of forest products.

Additional objects and features of the invention will appear from the following description in which the preferred embodiments are set forth in detail in connection with the accompanying drawings.

FIG. 3 is a side elevational view of a transducer incorporating the present invention with certain portions being broken away.

FIG. 4 is a front elevational view of the transducer shown in FIG. 3 looking along the line 4—4 of FIG. 3.

FIG. 5 is a cross-sectional view taken along the line 5—5 of FIG. 3.

FIG. 6 is a view looking along the line 6—6 of FIG. 5.

FIG. 7 is a rear elevational view of the transducer shown in FIG. 3.

FIG. 8 is an exploded view of the transducer shown in FIG. 3.

FIG. 9 is a graph showing the manner in which the diffraction of each element is directed towards the axis of the transducer.

FIG. 13 is a plan view of another transducer incorporating the present invention.

FIG. 14 is a cross-sectional view taken along the line 14—14 of FIG. 13.

FIG. 15 is still another embodiment of a transducer incorporating the present invention.

FIG. 16 is a block diagram of another system incorporating the present invention transmitting on multiple channels and receiving on a single channel.

FIG. 17 is a block diagram of another system incorporating the present invention transmitting and receiving on a single channel.

Figure 1:
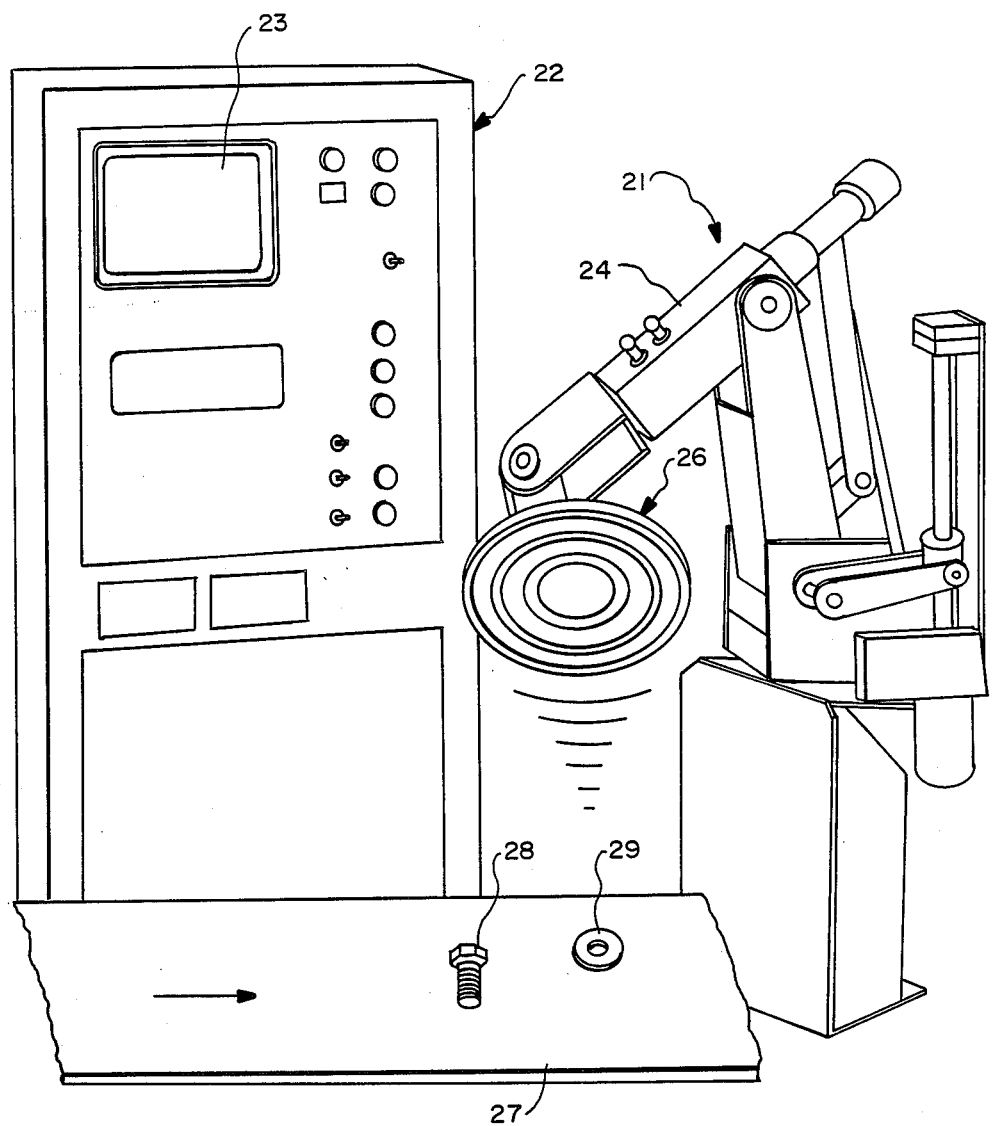
FIG. 1 is a perspective view of an apparatus, system and method incorporating the present invention and being utilized in a robotic application.

In FIG. 1 there is shown a robot 21 which is provided with an ultrasonic apparatus, system and method incorporating the present invention. The robot 21 is controlled by a control system mounted in a console 22. The control console 22 contains electronics of the type hereinafter described. Also included is a video monitor 23. The robot is provided with a six axis (plus grasp) all electric overhead arm 24. An ultrasonic transducer 26 incorporating the present invention is carried by the arm and is used for sensing information for operation of the arm.

In the application shown, the robot 21 is mounted along side a conveyor 27 and has parts carried by as for example screws 28 and washers 29 at which are to be sensed by the transducer 26 in connection with the operation of the robot 21. In a typical application, the robot has a necessity for locating and identifying the parts which are moving on the conveyor and thereafter picking up the parts and performing certain operations with the parts.

Numerous methods can be used for identifying and locating objects in three dimensions. The returned echos can be utilized for this purpose since the ultrasonic beam which is highly focused represents points in space to provide imaging data for object recognition by a robot or other automatic device. This makes it easy for an end user to use a robotic vision system at a work place. This can be effected by taking an acoustic picture of an object with the scanning system mounted on a precisely controlled robot. Sufficient views of the object can be taken with the scanner to locate all unique features of the object. This pattern is stored in a computer memory. The computer can be provided with a graphics software capability which through the use of appropriate algorithms can be used to provide a 90° translation of any view of a facet of the object or to revolve the object stored in the memory about any of its three axes and translate the shape, outline and object position by a single scan or scans of the complete object. Also it can be used to store in the memory the precise coordinate location of the robot stored. All of this can be accomplished without the need for sophisticated software or applied mathematics on the part of the user.

Figure 2:
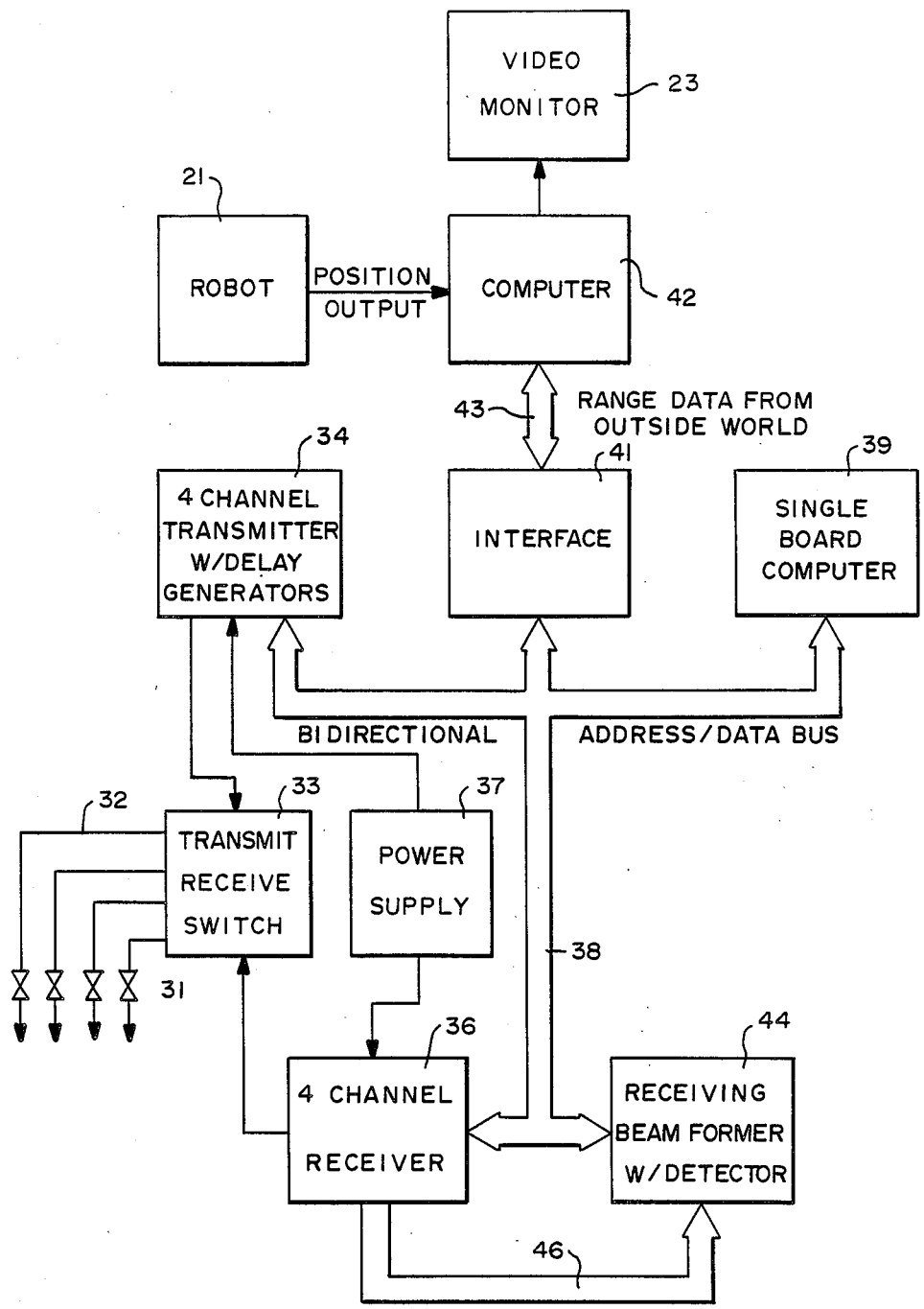
FIG. 2 is a schematic block diagram of a typical system incorporating the present invention.

In FIG. 2 there is shown a system in block form showing the components necessary to provide a computer with ranging information for operation of the robot. As hereinafter explained, the transducer 26 includes one or more elements or rings which are simulated at 31 and which are connected by conductors 32 to a transmit-receive switch 33. The transmit and receive switch 33 is provided to permit the receivers and transmitters of the system to communicate with the transducer 26 at appropriate intervals of time. The transmit receive switch 33 is of a conventional construction and is connected to a four-channel transmitter 34 and a four-channel receiver 36. The transmit receive switch 33 establishes the timing for sequential communication with the transducer by the transmitters and receivers 34 and 36. The transmitters 34 and receivers 36 are provided with a suitable D.C. power supply 37 with a voltage ranging from 100 to 550 volts but preferably approximately 450 volts. A bidirectional address-/data bus 38 establishes communication between a single board computer 39 and interface block 41 which is in communication with a host computer 42 through a bus 43. The bidirectional address data bus also establishes communication between the single board computer 39 and the four-channel transmitter 34 and the four-channel receiver 36 as well as a receiving beam former 44 with detector. A local one-way bus 46 is provided for establishing communication between the four-channel receiver 36 and the receiving beam former 44.

The four-channel transmitter is provided with delay generators and accepts data bus commands for delay times on each transmit ring and accepts firing commands from the same bus. Transmission is delayed on at least three of the four channels to create a focused effect by the use of the delay generators. The transmitter 34 is capable of running in a free running mode. When this is the case, it will transmit on all four elements or rings using standard delay times so as to weakly focus the energy beam to provide a large depth field. When it is desired to look at an object more closely, the depth of field can be decreased under the control of the single board computer 39 to specifically focus the ultrasonic energy into a particular region. Alternatively, a single search pulse can be sent out to determine the target range. Using this range data transmitter delay times can be set in order to focus all energy at a point in space in transmission. Three modes of operation are possible: (1) weakly focused transmit, hard focused recive, (2) sharply focused transmit, weakly focused receive and (3) sharply focused transmit, sharply focused receive. Modes (1) and (2) produce equal lateral resolution and (3) produces greater accuracy. Modes (1) and (2) are less expensive and easier to implement whereas mode (3) is more costly.

The four-channel receiver 36 is comprised of four substantially identical amplifiers having a band width of 50 percent with a center frequency on the order of 250 kilohertz. The band width provided makes it possible to receive echos which are amplified and then sent to the receiving beam former 44. The four-channel receiver is provided with a board multiplex bus. The beam former 44 introduces electronic delays in a manner well known to those skilled in the art to compensate for the different path lengths of the received echos which in effect is electronically changing the focal length of the acoustical detector. The receiving beam former 44 with detector will provide an output on the bidirectional address-/data bus to the effect that an echo has been received at a particular point in time which will be recognized by the single board computer 39 as a returned echo. As explained earlier, the single board computer directed the transmitter to supply a pulse at time zero and then begin counting on its internal clock until an echo is received. It then converts that time into a path length which is supplied through the interface 41 to the host computer 42. Thus it can be seen that the single board computer causes firing of the transmitter and after receiving information from the receiver 36 through the receiving beam former 44 with detector calculates the range of the object being viewed.

The interface block 41 makes it possible to automatically output range data from over two inches to 12 inches in range. The interface block 41 can be utilized to focus the transmitter at a predetermined range. The interface block 41 upon request will pass data from each channel separately. The single board computer 39 can be utilized to perform diagnostics to transfer data, store look up tables and calculate delays.

The four-channel receiver 36 receives information from each ring or channel. It amplifies and filters each channel to give a signal at a 12 inch range with a flat target with low noise. The four-channel receiver will accept multiplex control from the beam former 44. It also supplies an output to the beam former through the local one-way bus 46. The receiving beam former 44 listens to the four-channel receiver 36 through the local one-way bus. It sums the information in each channel to give a formed output. The beam former can also accept data bus commands and to pass only one channel if desired (for diagnostics). It has a digital threshhold detector and places a pulse on the bidirectional address-/data bus 38 whenever an echo comes in. Typically it is provided with three memories which can be utilized for storing the amplitudes of each of up to three echos. It dumps the amplitudes of each of the three echos on to the bidirectional address/data bus 38 at the request of the single board computer 33.

The acoustical transducer 26 used in the present invention is shown in detail in FIGS. 3 through 8. As shown therein, the transducer 26 consists of a cylindrical annulus or body 51 which is provided with a cylindrical central opening 52. A flexible sheet or foil 53 is stretched over the opening 52 and is clamped in place by a clamping ring 54 which is secured to the body 51 by a suitable means such as screws 56. The sheet or foil 53 is comprised of a suitable flexible film of insulating material such as polypropylene having a thickness ranging from 6 to 10 microns upon which there is evaporated a thin layer of a suitable conducting material such as aluminum or gold to provide a resistivity of 2–4 ohms per square. The aluminum layer can have a thickness ranging from 50 to 300 Angstroms and typically has a thickness of approximately 200 Angstroms. Resistivity up to approximately 200 ohms per square can be tolerated with the lower limit being zero. The foil or film 53 must be sufficiently thin to act as a sensitive receiver and also have a high dielectric constant so it has the capability of withstanding the high bias voltage. Typically the films can be of plastic as, for example, Kapton having a thickness of 0.0003 inches, a polypropylene having a thickness of 0.0004 inches and Teflon having a thickness of 0.00025 inches. Each of those were found to operate satisfactorily to produce ultrasonic frequencies up to 500 kilohertz.

A circular relatively rigid backing plate 57 is provided which is formed of a suitable non-conductive material as, for example, a plastic having a suitable thickness as, for example, one-quarter of an inch. A plurality of elements having conducting surfaces are mounted upon this backing plate 57. As shown on the drawings, the elements consist of a center element in the form of a cylinder 58 and three additional elements in the form of concentric rings 59, 61 and 62 to provide for a total of four elements, all of which are secured to the backing plate 57 by suitable means such as screws 63. In the arrangement shown, three screws 63 spaced 120° apart are provided for securing each of the rings 59, 61 and 62 to the backing plate 57. As can be seen, the elements 58, 59, 61 and 62 have conducting surfaces 64 which lie in a plane parallel to the top surface 65 of the body 51 and also parallel to the planar surface 66 formed on the backing plate. The elements or rings 59, 61 and 62 are provided with inwardly extending annular lips 59a, 61a and 62a which are secured to the backing plate 57 by screws 63 which are countersunk in holes 67 provided in the backing plate 57 and are threaded into threaded holes 69 in the lips 59c, 61a and 62a and in the element 58. The backing plate 57 with its elements 58, 59, 61 and 62 carried thereby is secured to the body 51 in a suitable manner. For example, as shown, a rear shroud 69 in the form of a circular plate formed of a suitable material such as metal is secured to the body 52 by screws 71 extending through mounting holes 72 and threaded into threaded bores 73 in the backing plate 57 as well as into threaded bores 56 in the body 51. An electrical connector 74 is mounted in the rear of the shroud 68 in a hole 75 and is connected by suitable coaxial wires (not shown) to the screws 63 to form electrical connections to the elements 58, 59, 61 and 62. As hereinbefore explained the polypropylene foil 53 is mounted in such a manner that the non-coated or insulating side faces the elements 58, 59, 61 and 62 and the coated side faces away from the elements.

A screen 76 formed of a suitable material such as steel wire mesh as, for example, ⅛th or ¼ inch mesh overlies the plated side of the polypropylene foil 53 and serves to protect the foil 53. A rubber annular gasket 77 overlies the clamping ring 54 and the screws 56. A circular front shroud 78 is provided which is L-shaped in cross section has an annular lip 79 overlying the outer margin of the screen 76. The front shroud extends over the body 51 and is secured thereto by screws 81 extending into threaded bores 82 provided in the body 51.

A mounting bracket 96 is provided for the transducer 26 and as shown in FIG. 3 is L-shaped in cross section and is secured to the body 51 by screws 97.

The surfaces 64 of the elements 58, 59, 61 and 62 are treated in a particular manner to achieve the particularly desirable results of the present invention. The elements 58, 59, 61 and 62 are formed of a suitable conductive material and preferably are formed of an aluminum alloy. One aluminum alloy found to be particularly satisfactory is identified as alloy 5086-T-116. This is a corrosion resistant marine-type alloy. The elements 58, 59, 60, 61 and 62 were all machined from a sheet of aluminum alloy having a thickness of one-half inch or greater. As can be seen, the element 58 is formed as a cylindrical piston whereas the elements 59, 61 and 62 are formed in the manner shown which is substantially L-shaped in cross section. The surfaces 64 of the elements were polished to an optical shiny finish. This is accomplished by utilizing sandpaper and a polishing cloth in a lathe.

After this optically shiny finish had been achieved, the elements 58, 59, 61 and 62 were treated with a ferric chloride solution. This was accomplished by purchasing a commercial ferric chloride and diluting the same with water. The ferric chloride ($Fe_2Cl_3$) was diluted with one-third water to provide a solution of $66\frac{2}{3}\%$ ferric chloride and $33\frac{1}{3}\%$ water. The dilute ferric chloride was placed in a container at room temperature and pressure. The surfaces 64 were etched in this solution by repeatedly dipping the elements into the solution for a period of time ranging from 2 to 3 minutes. Preferably this accomplished by introducing the elements into the solution for periods of one minute each, removing the same and drying them to examine the etching on the surfaces 64. Typically to obtain the desired frequency of operation for the transducer 26, it has been found that the dipping should occur two to three times at one minute each to achieve the desired roughness of the surfaces 64. It has been found by way of example that just a one minute etch will give a frequency of 300 to 400 kilohertz (300–400 khz). Further etching provides a further roughness and will give a resonant frequency of approximately 250 kilohertz. In performing this dipping operation it has been found that it is desirable to mount the elements 58, 59, 61 and 62 on the backing plate 57 and to dip the entire assembly into the etching solution. It is believed that this etching provides roughened surfaces 64 which underlie the unplated side of the foil 53. Alternatively, the roughened surface can be obtained, although not as effectively, by sandblasting, machining or scrubbing. The roughened surface formed by etching is provided by an aluminum oxide layer of a thickness determined by the etching time. Since this aluminum oxide layer has insulating properties it serves as an additional dielectric layer.

The upper frequency limit is determined by (a) the thickness of the film (film thickness is inversely proportional to frequency) and (b) the surface finish of the solid metal plate of the capacitor (the smoother the surface finish the higher the frequency). Higher frequencies are desirable in order to achieve improved lateral and ranging resolution capabilities. However, it should be appreciated that the attenuation of such higher frequencies increases greatly as the frequency increases.

After the etching operation has been completed, the foil 53 is stretched over the annular body 51 and clamped in place by use of the clamping ring 54. Thereafter, the backing plate 57 with the elements secured thereto is inserted so that the surfaces come into engagement with the foil.

With the electrical connections hereinbefore described, the front surface or plated side of the foil 53 is at ground potential whereas the elements 58, 59, 60 and 61 which are connected by the coaxial cables (not shown) to the transmit receive switch 33 are above ground so there is in effect provided a capacitor in which the metal coating on one side of the foil 53 serves as one metal plate, the polypropylene cf the foil serves as an insulator and the surfaces 64 serve as the metal plate on the other side of the insulator to provide what can be considered a Sell-type transducer.

The transducer 26 after it has been assembled in the manner hereinbefore described and is connected to a system of the type described in FIG. 2 is pulsed with a high voltage typically in the vicinity of 100–500 volts that is applied between the grounded front surface of the foil 53 and an element of the elements 58, 59, 61 and 62.

In an operation, the application of high voltage between a ring or element and the front surface of the foil creates an attraction between the ring and the foil. This movement of the foil at high frequencies creates the ultrasonic energy utilized in the present invention. It has been found that as the voltage is increased, the signal to noise ratio is enhanced with respect to the returned echos. The change in voltage however has no appreciable effect on the frequency. It is, however, generally desirable to utilize as high a voltage as possible.

In the present invention the frequency of operation is controlled by (1) etching on the capacitor plate, and (2) external series inductance and, (3) film thickness. The beam former as used in the present invention shapes the sound beam and dynamically focuses the sound beam in transmit and receive at any point on the axis of the array to achieve high lateral resolution. In the beam former the signals from the array elements are delayed to produce a soft transmit focus over a large depth of field. Because of these delays, signals from each element will arrive at a target on the axis of the array roughly in phase, i.e., focused. Alternately, signals can be delayed in transmit to arrive at a point on the axis of the array at the same time to achieve focusing. If the object distance is known, a very precise focus can be achieved by appropriate delays. Alternatively, if object distance is unknown, a soft focus of a large depth of field can be used or a single search pulse can be transmitted to determine range.

The receiving beam former with detector 44 listens to the incoming signals through the local one-way bus 46. It sums the signals on each channel to give a formed output. It also can receive address/data bus commands that pass only one channel if desired as, for example, for diagnostic purposes. It has a digital threshold detector and dumps pulse information on the address/data bus whenever an echo is received. It is provided with three memories to store the amplitude of each of the echos up to 3 echos. It dumps the amplitudes of the echos onto the address/data bus at the request of the signal board computer 39.

The transmission pattern generated by the phased array transducer 26 is shown in FIG. 9. As hereinbefore explained, the phased array is a substantially conventional Sell-type transducer of annular design. It is provided with a central element 58 which is disc-like in conformation rather than being in the form of an annulus whereas the elements 59, 61 and 62 are in the form of annuli with the annuli decreasing in radial thickness the nearer they are to the outer extremity of the annular array. Thus the outermost ring or annulus has the thinnest radial measurement.

The transmission pattern of ultrasonic energy from each of these elements is indicated by the lobes 101, 102, 103 and 104 with lobe 101 being associated with the central element 58 and the side lobs 102, 103, and 104 being associated with the elements 59, 61 and 62 respectively. The size of the central element or disc 58 is chosen to provide a main lobe 101 which generally corresponds to the desired field of view for the transducer 26 and provides the minimum usable range. The elements 59, 61 and 62 provide ultrasonic energy transmission in the form of main lobes 102, 103 and 104 in which the main lobe 102 has the smallest diffraction, main lobe 103 has medium diffraction and the main lobe 104 has large diffraction. As is appreciated by those skilled in the art, the farther the element is from the center of the array, the greater the diffraction required in order to have the energy be diffracted towards the axis of symmetry of the array. In other words, all the elements of the array must be able to diffract energy towards the axis of the array. The central element 58 generally has a diameter which is approximately 20% of the array diameter in order to provide the narrow beam or main lobe 101. The transducer can be of any suitable size as, for example, a cylinder having a diameter of approximately four inches and an actual thickness of approximately three quarters of an inch.

In operation of the transducer 26 in a robotics application as shown in FIG. 1, the transducer 26 is mounted in the scan head carried by the end of the robot arm 24 to give the scan head a field of view which corresponds to the work area of the robot arm 24 of the robot 21. The scan head 26 can be moved by the arm 24 across the object which in this case may be a bolt 28 or a washer 29 to determine as many points or spots on the object being scanned as are required to establish the true shape of the object. The position of the scan head 26 is known since the position of the robot 21 is known.

The system which is shown in FIG. 2 sends out pulses of high frequency sound from the transducer or scan head 26 and receives high frequency sound reflected by the object being scanned. The system shown in FIG. 2 also measures the time of flight to and from the object being scanned and converts this into range data since the speed of sound in the air is known. Only a very small portion of the object being scanned can be scanned at any one time to ensure that specific features of the object can be seen. The narrow shape of the sound beam is achieved electronically through the use of the beam former 44. The beam former 44 utilizes time delays on both transmit and receive to constructively phase transmit and receive signals from individual array elements so that a dynamically focused energy beam is obtained. Each of the array elements in the transducer 26 has a known position in the array. By timing the transmission of the signal from each of the array elements, all signals can be made to arrive at a point in space, on axis, at the same time. Conversely each element of the array can receive a signal at the same time if a delay, based on this position, is imposed on each element. Because of the array geometry and the timing delays used, signals can only be constructively added at a known position in space to achieve the desired information.

As hereinbefore explained, the scan head transducer 26 serves as an electrostatic transducer which is used to both transmit and receive accoustic signals. It is comprised of metalized foil 53 which is engaged by radial surfaces of concentric array elements 58, 59, 61 and 62. One side of the foil 53 serves as one plate of a capacitor with the film itself being the dielectric of the capacitor and with the metallic surfaces 64 of the array elements being the opposite plate of the capicator. The active area of the array is the surface area 64 in contact with the film or foil 53.

The physical aspects of the array are determined by the overall lateral resolution desired, physical size limitations of the aperture, operating frequency and how close into the center of the array the target or object must be seen. Some of these factors are not mutually exclusive. For an array to have a large aperture, the outer ring must have a diffraction pattern such that its half beam width which will illuminate a target at the closest desired point to the array. For a four inch aperture and a specification to see a target at two inch actual distance from the array, the element width must be roughly 0.024 inches. This very narrow element width results in a lack of receiver sensitivity because very little signal can be received. To overcome this limitation, the element width has been increased sufficiently, so that it will be a good receiver.

With a system and apparatus and method of the above character it has been possible to provide vision quality accoustic imaging on a real time basis which is particularly useful for robotic applications. Each of the elements of the phased array serves as a separate electrostatic transducer which when all four lobes are combined produce a highly directional ultrasonic beam.

As hereinbefore explained, it may be desirable to make the outer annular element of an annular array thicker or having greater radial dimension in order to make it possible to use more power in the transmitter and also to provide additional receiving area and thereby improve the signal to noise ratio and as a consequence improve the range resolution. However, as soon as a thicker outer ring is utilized, the thicker the ring the less it will diffract its energy into the desired location along the center axis of the array until a substantial distance from the array which would make it very difficult for the transducer to image any object which was very close in. Because of the attenuation in the air, it also would be difficult to receive echos from the object located at a remote distance. With apparatus of this type, it has been found that it is possible to readily image objects of various sizes. For example, it has been found that a wire 0.007 inch in diameter which is located approximately one foot in front of the transducer can be readily imaged, utilizing a broad band pulse having a center frequency of approximately 250 kilohertz and a 50% band width.

Figure 11:
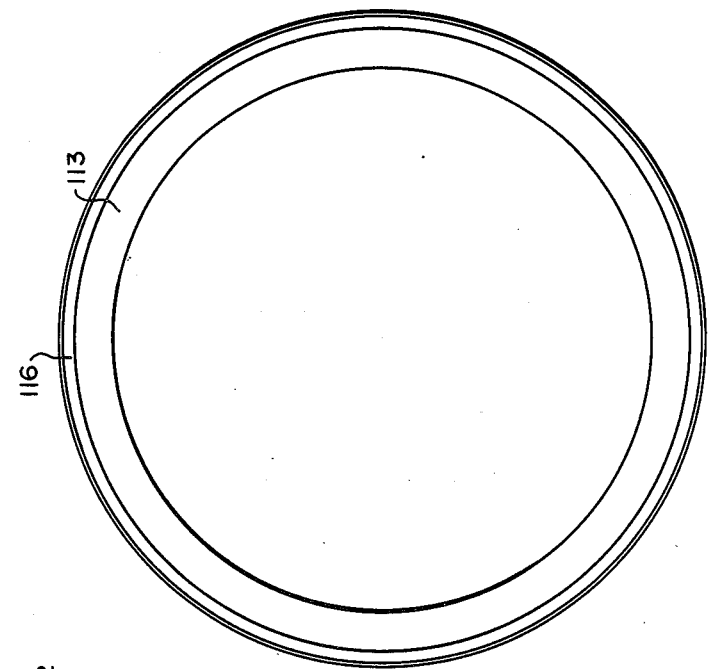
FIG. 11 is a plan view of the mirror taken along line 11—11 of FIG. 10.
Figure 10:
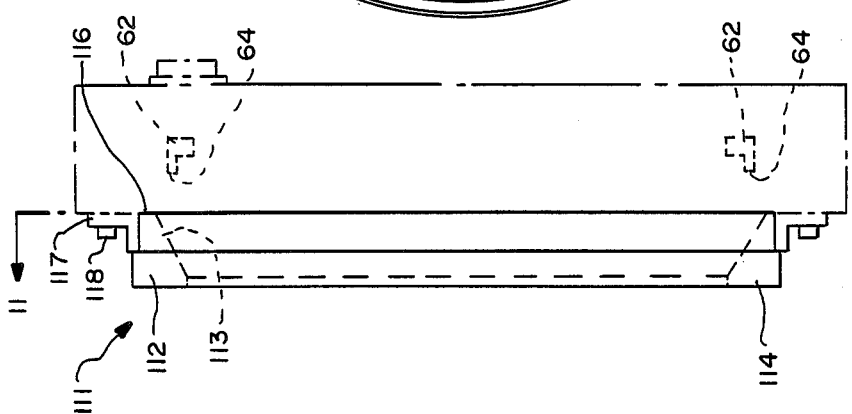
FIG. 10 is a side elevational view of a mirror which can be utilized in conjunction with the transducer shown in FIG. 3.

Another embodiment of the invention is shown in FIGS. 10 and 11 in which a transducer 26 has a mirror 111 mounted thereon. The mirror 111 can be formed of a cylindrical body 112 of a suitable material such as aluminum. A recess 113 extends through the central portion of the body 112 and is in the form of a truncated cone which extends through the upper and lower surfaces 114 and 116 of the body 112. The surface forming the recess 113 is relatively highly polished and is provided with a suitable angle so as to act as a mirror for reflecting ultrasonic energy from the surface 64 of an outer annular element 62a. The mirror 111 can be secured to the transducer 26 in a suitable manner such as by the use of L-shaped brackets 117 secured to the body 112 by suitable means such as welding and secured to the transducer 26 by suitable means such as screws 118. The use of the mirror 112 makes it possible to bend the beam pattern from the annular element towards the axis of the phased array and therefore makes it possible to use an element having a greater thickness in a radial direction for the reasons hereinbefore pointed out.

Figure 12:
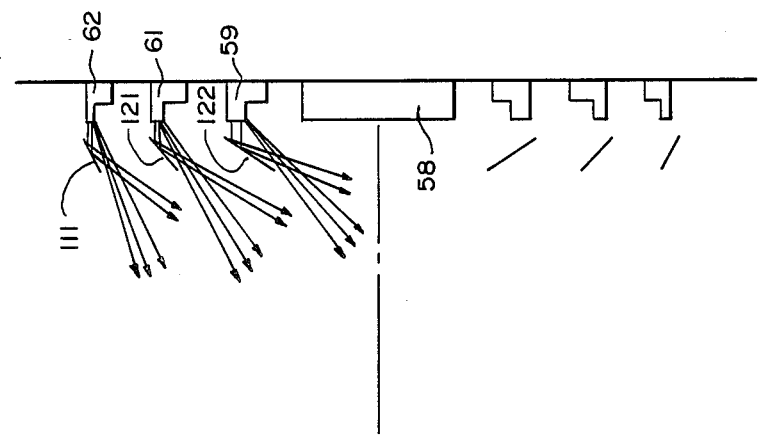
FIG. 12 is a graph showing the effects of the mirror of the type shown in FIGS. 10 and 11 being used in connection with a transducer of the type shown in FIG. 3.

Although in FIGS. 10 and 11 only a single mirror 111 has been utilized for the outer annular element 62, it should be appreciated that mirrors can be also utilized for the other annular elements in the array. Thus as shown in FIG. 12, additional mirrors 121 and 122 can be provided for the annular elements 61 and 59. This makes it possible to make the element 61 with a greater thickness. Also the element 59 can be made of a somewhat greater thickness. As indicated by the rays shown in FIG. 12, the mirrors serve to bend at least certain of the ultrasonic rays emerging from the elements in a direction so that they are focused along the axis of the annular array. The nearest usable range for the annular transducer is the one where the energy from each element can be focused into the axis of symmetry for the array. The mirrors permit the use of larger than standard elements and therefore permit the use of greater power. They also make possible an improved signal to noise ratio for reception thereby improving the range, resolution and accuracy of the phased array.

In FIGS. 13 and 14, there is shown a mirror structure 126 which is particularly applicable when a multiplicity of mirrors are used in conjunction with a phased array. Thus as shown in FIGS. 13 and 14 there is provided a body 112 which is provided with the mirror surface forming the recess 113. A support structure 127 is mounted within the recess 113 and is provided with three legs 128 which are joined at the center and which are mounted in the body 112. The mirrors 121 and 122 shown in FIG. 12 can be mounted upon this structure 127 in a suitable manner such as by having the legs 128 extend through openings provided in the mirrors 121 and 122 which as shown are mounted so that they are disposed at predetermined angles so as to provide the appropriate reflection for the beams from the associated elements of the array. As with the surface 113, the surfaces provided by the mirrors 121 and 122 are geometrically represented by truncated portions of a cone. The surfaces 113 provided by the body 112 and the surfaces provided on the mirrors 121 and 122 need not necessarily be provided by metallic surfaces. It is, however, necessary that these surfaces not absorb sound but they reflect sound. Thus in addition to being made out of metal, they also can be made out of plastic and even paper if it has a relatively hard surface which will not absorb sound.

Another embodiment of the invention is shown in Figure 15 in which a transducer 131 is shown. The transducer is of a type hereinbefore described but is provided with only three elements rather than the four elements of the previous embodiment. Thus it consists of a central element 132 which can be in the form of a cylinder, an intermediate annular element 133 and an outer element 134. The elements 133 and 134 can have a radial thickness greater than the normally calculated radial thickness for such an array so as to make possible greater transmitting and receiving capabilities as hereinbefore described. In order to make this possible, an accoustic horn structure 136 is provided. This horn structure is provided with accoustic passages 137 and 138 which are associated with the elements 134 and 133 respectively. Each of the accoustic passages includes an inner horn-like passage 141, which is large enough to encompass the radial dimension of the annular element 134 and narrows down to an accoustic wave guide 142 which opens into an outer horn-like passage 143. Thus it can be seen that there is provided, in effect, a double horn-like configuration which serves as a sound bender to bend the sound waves so that they are directed onto the axis of the array within a relatively short distance from the array. As can be seen from the arrows in FIG. 15, the double horn structure serves to take the ultrasonic energy from the annular elements 134 and to narrow them down into an acoustic wave guide and thereafter expand the same in a different direction so that they are focused onto the axis of the annular array of the transducer 131. From the front side it can be seen that the acoustic horn structure 136 will have concentric openings or slots through which the sound will pass. The acoustic horn structure can be formed out of any suitable material which does not absorb sound as, for example, metal or plastic.

Although the present invention has been described primarily in connection with robotic applications, it should be appreciated that the apparatus, system and method of the present invention can also be utilized in other fields as, for example, the medical field. The horn, lens or mirror structure will provide significantly better imaging quality, particularly on the outer rings of a medical annular phased array where these outer rings tend to be thinner than the inner rings. The robotic applications hereinbefore escribed have been applications in which imaging is through air. In the medical field the imaging is very often through liquids such as water or other body liquids. The use of mirrors and horn structures hereinbefore described in medical applications makes it possible to provide apparatus in which more transmitting power could be applied and more sensitivity could be obtained with respect to sound energy that is received to thereby provide a sharper image from a deeper field. Alternatively, lenses can be used in such applications.

Another system incorporating the present invention is shown in FIG. 16 and consists of four elements 31 of a transducer of the type hereinbefore described which are connected to a transmit receive switch 33. The transmit receive switch 33 is connected to a single channel receiver/detector 151 which is connected to a single element 31 as, for example, the central element. The output of the receiver 151 is connected to a block 152 which includes an input-output (I/O) computer interface, a timer and transmit delay tables. The block 152 is connected to the computer bus output of a conventional type computer such as one hereinbefore described. The block 152 is also connected to a plurality of delay generators 153 operating as beam formers. The delay generators 153 are connected to a multi-channel transmitter 154 which is connected through the transmit receive switch 33 to the multiple elements 31. Thus it can be seen that there has been provided a system which utilizes dynamic (variable) transmit focusing for focusing ultrasonic energy emanating from the transducer formed by the elements 31. By providing such dynamic focusing, it is possible to first weakly focus over a relatively broad area and then after the first echo is received, determine the range of the object. Thereafter the focus is sharpened so that the ultrasonic energy is focused onto a small area which is in the immediate area of the object being sensed. In this way, it is possible to obtain high resolution of the object. The use of a single channel receiver in this system greatly simplifies and reduces the cost of the system.

Still another embodiment of a system incorporating the present invention is shown in FIG. 17 in which a single transducer element 31 is used which is connected to a transmit receive switch 156. The transmit receive switch 156 is connected to a single channel receiver/detector 157. The receiver/detector 157 is connected to a timer board 158 which includes time of flight or target range capabilities. This board 158 is connected to a digital range display 159 of a conventional type. The transmit receive switch 156 is also connected to a transmitter 151 which can be free running or pulsed. It is connected to the timer board 158 and supplies timer synchronizing pulses to the timer board 158.

As can be seen the system shown in FIG. 17 is simplified over that shown in earlier embodiments of the invention. It has only one channel for both transmit and receive. A single piston transducer as, for example, one of one inch in diameter can be utilized for the element 31. The lateral resolution provided by a system such as that shown in FIG. 17 is inferior to that which is provided with the systems hereinbefore described. However, the system shown in FIG. 17 is advantageous in certain applications where it is desired to provide a low cost simple system where only range to target information is desired. For example, the edge detection of boards in a lumber mill is an application for such a system.

What is claimed is:

1. In an ultrasonic apparatus for use in detecting an object, a capacitive type transducer, transmitter means for supplying pulses, receiver means, transmit receive switch means and means for causing operation of said transmit receive switch means to cause supplying of pulses from the transmitter means to said transducer to create transmitted ultrasonic energy and for receiving reflected ultrasonic energy received by the transducer, said transducer comprising a body having an opening therein, a rigid backing plate carried by the body and disposed in the opening, metallic means carried by the backing plate and providing a planar surface, a layer of flexible insulating material overlying the metallic means and a thin layer of conducting material disposed on the layer of flexible insulating material on the side facing away from the metallic means, the planar surface of the metallic means having sandpaper-like formed annular grooves disposed therein and facing towards the layer of flexible insulating material.

2. Apparatus as in claim 1 wherein said metallic means of said transducer is comprised of a plurality of elements formed into a multi-element array having a predetermined focal point and wherein said transmitter means has multiple channels, said transmitter means including means for delaying the pulses supplied to the elements of the multi-element array in accordance with the distance that the elements are from the predetermined focal point for the multi-element array so that the transmitted ultrasonic energy from the multi-element array will arrive at approximately the same point along the axis of the array, said transmitted ultrasonic energy being adapted to be reflected by the object to provide reflected ultrasonic energy which can be received by the multi-element array.

3. Apparatus as in claim 2 together with mirror means for reflecting transmitted ultrasonic energy from at least certain of said elements of the multi-element array whereby transmitted ultrasonic energy from the elements of the ray is in phase at a predetermined point on the central axis of the array.

4. Apparatus as in claim 2 wherein said receiver means has multiple channels together with beam forming means for receiving the signals from the multi-channel receiver means and introducing delays to compensate for the different path lengths traveled by the received ultrasonic energy to the elements of the multi-element array.

5. Apparatus as in claim 4 together with computer means for controlling the operation of the multi-channel transmitter means, the multi-channel receiver means, the transmit receive switch means and the receiving beam forming means.

6. Apparatus as in claim 1 wherein said transducer means is in the form of an electrostatic transducer.

7. Apparatus as in claim 1 together with mirror means for reflecting energy from said at least one of the elements.

8. Apparatus as in claim 1 wherein said transducer has an ultrasonic frequency capability ranging from 50 to 500 kilohertz.

9. Apparatus as in claim 2 wherein said elements of the multi-element array are formed of substantially continuous annular elements.

10. Apparatus as in claim 1 wherein the horn-like means provides a normal lobe pattern together with horn-like means for directing transmitted ultrasonic energy away from and for receiving reflected ultrasonic energy in directions which differ substantially from the normal lobe pattern formed by the element.

11. Apparatus as in claim 10 wherein said horn-like means is in the form of a double horn.

12. In an ultrasonic transducer, a body having an opening therein, a rigid backing plate carried by the body and disposed in the opening, metallic means carried by the backing plate and providing a planar surface, a layer of flexible insulating material overlying the metallic means and a thin layer of conducting material disposed on the layer of flexible insulating material on the side facing away from the metallic means, the planar surface having sandpaper-like formed annular grooves disposed therein.

13. A transducer as in claim 12 wherein said metallic means is formed of an aluminum alloy.

14. Apparatus as in claim 13 wherein and aluminum alloy is 5086-T-116.

15. A transducer as in claim 12 wherein said metallic means is substantially continuous and annular.

16. Apparatus as in claim 15 wherein said metallic means is in the form of a plurality of concentric elements providing a multi-element array having an axis.

17. A transducer as in claim 16 together with mirror means for redirecting the energy from at least a plurality of the elements of the multi-element array so that the energy from the multi-element array will be directed along the axis of the multi-element array.

18. A transducer as in claim 16 together with horn-like means for redirecting the energy from at least one of the elements of the multi-element array.

19. A transducer as in claim 18 wherein said horn-like means are in the form of a double horn.

20. Apparatus as in claim 12 wherein the metallic means is in the form of a cylinder.

21. A transducer as in claim 12 together with mirror means for reflecting energy from the metallic means.

* * * * *